(12) United States Patent
Wojciechowski et al.

(10) Patent No.: US 9,163,511 B2
(45) Date of Patent: Oct. 20, 2015

(54) STEAM TURBINE BUCKET TENON RESTORATION THROUGH SOLID STATE BONDING PROCESS

(71) Applicant: General Electric Company, Schenectady, NY (US)

(72) Inventors: Marek Wojciechowski, Piaseczno (PL); Marciej Jan Żarnik, Wola Batorska (PL)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 356 days.

(21) Appl. No.: 13/719,557

(22) Filed: Dec. 19, 2012

(65) Prior Publication Data

US 2014/0041223 A1    Feb. 13, 2014

(30) Foreign Application Priority Data

Aug. 9, 2012    (PL) .......................................... 400310

(51) Int. Cl.
*F01D 5/00* (2006.01)
*F01D 5/14* (2006.01)
*B23P 6/00* (2006.01)

(52) U.S. Cl.
CPC ...... *F01D 5/005* (2013.01); *F01D 5/14* (2013.01); *B23P 6/007* (2013.01);
(Continued)

(58) Field of Classification Search
CPC ..... F01D 5/0058; F01D 5/3069; F01D 5/326; F05D 2230/239; F05D 2230/70; F05D 2230/72; F05D 2230/80; F05D 2260/30; B21K 3/04; Y10T 29/49723; Y10T 29/49732; Y10T 29/49734; Y10T 29/49737; Y10T 29/49742; Y10T 29/49318; Y10T 29/49915; Y10T 29/4992; B23P 6/002; B23P 6/005; B23P 6/007; B23P 2700/13

See application file for complete search history.

(56) References Cited

U.S. PATENT DOCUMENTS 4,896,408 A * 1/1990 Fraser .......................... 29/889.1
6,095,402 A     8/2000 Brownell et al.
(Continued)

FOREIGN PATENT DOCUMENTS

EP    0850718 A1    7/1998
EP    2071125 A1    6/2009
(Continued)

OTHER PUBLICATIONS

Search Report from PL Application No. P-400310 dated Feb. 5, 2013.

*Primary Examiner* — Jason L Vaughan
(74) *Attorney, Agent, or Firm* — Cooper Legal Group, LLC

(57) ABSTRACT

Tenons can be installed at the ends of turbine blades by applying a solid state bonding procedure such as a friction welding technique to join the tenons to the turbine blades. The tenons can be employed to assemble the turbine blades to one or more covers for the turbine blades. The tenons can be installed in connection with the restoration of tenons for turbine buckets in steam turbines and in connection with the renovation of rotor assemblies that include turbine blades secured to a common disk, tenons located at one end of respective turbine blades and one or more covers secured to the turbine blades by means of the tenons. In instances in which tenon remnants are present at the ends of the turbine blades, tenon enlargement elements can be joined to the tenon remnants by the solid state bonding procedure. The tenon installations can be carried out in situ.

9 Claims, 3 Drawing Sheets

(52) U.S. Cl.
CPC ...... *F05D 2230/239* (2013.01); *Y10T 29/4932* (2015.01); *Y10T 29/4992* (2015.01); *Y10T 29/49318* (2015.01); *Y10T 29/49321* (2015.01); *Y10T 29/49737* (2015.01)

(56) References Cited

U.S. PATENT DOCUMENTS

| | | | |
|---|---|---|---|
| 6,679,681 | B2 | 1/2004 | Burnett et al. |
| 6,883,700 | B2 | 4/2005 | Kottilingam et al. |
| 7,034,262 | B2 | 4/2006 | Fischer et al. |
| 7,326,873 | B2 | 2/2008 | Fischer et al. |
| 8,006,380 | B2 | 8/2011 | Rawson |
| 2001/0022936 | A1 | 9/2001 | Zimmermamm |
| 2003/0215329 | A1 | 11/2003 | Caddell, Jr. et al. |
| 2009/0113708 | A1 | 5/2009 | Bamberg et al. |
| 2009/0185908 | A1 | 7/2009 | Chung et al. |
| 2009/0193657 | A1 | 8/2009 | Wilson, Jr. et al. |
| 2011/0005075 | A1 | 1/2011 | Trewiler et al. |

FOREIGN PATENT DOCUMENTS

| | | |
|---|---|---|
| FR | 2923741 A1 | 5/2009 |
| PL | 194259 B1 | 5/2007 |
| PL | 199015 B1 | 8/2008 |

* cited by examiner

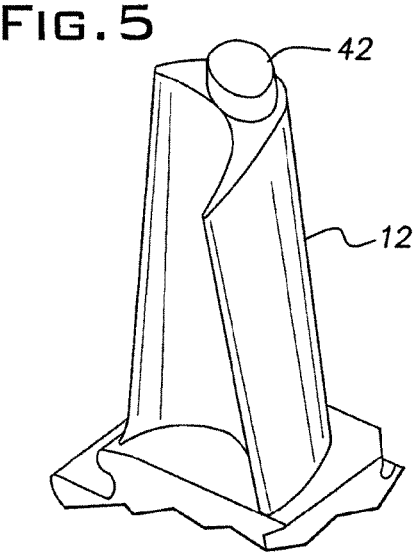
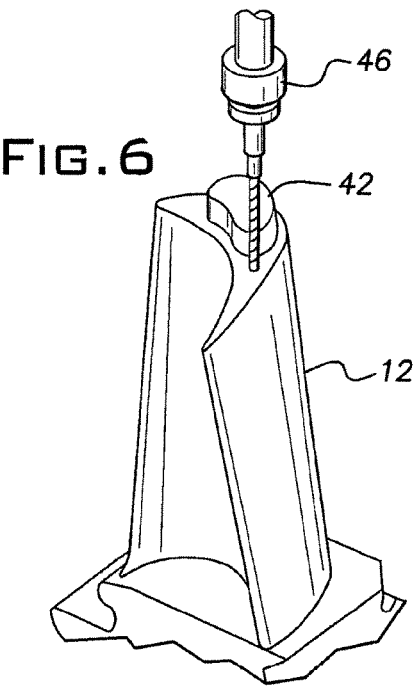
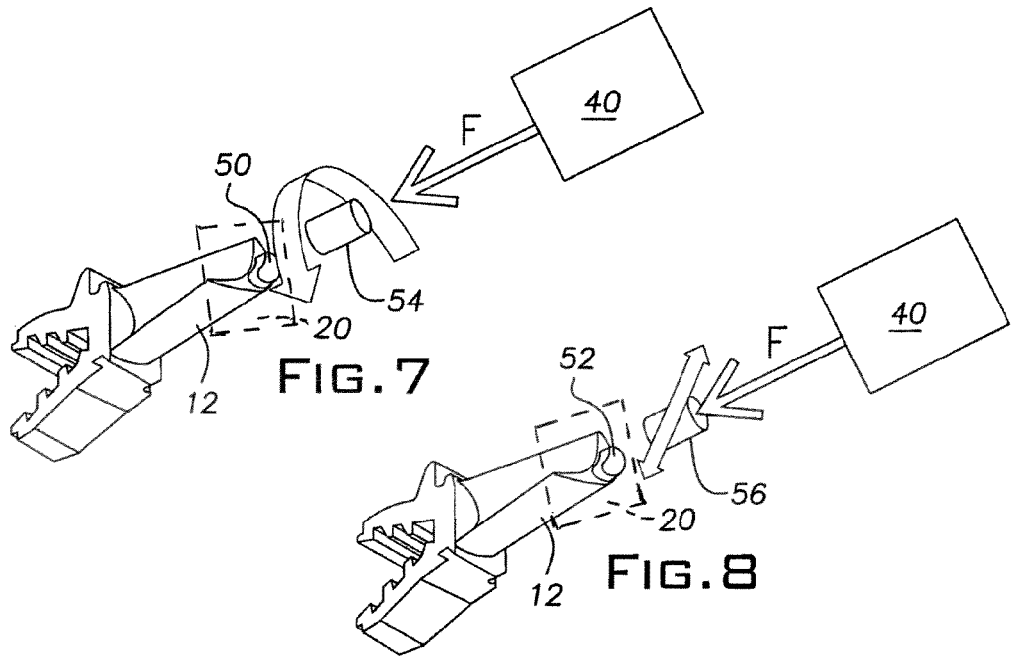

STEAM TURBINE BUCKET TENON RESTORATION THROUGH SOLID STATE BONDING PROCESS

BACKGROUND OF THE INVENTION

The present invention relates generally to methods concerning the installation of tenons at the turbine blades of rotor assemblies of turbine systems by the application of a solid state bonding procedure that joins the tenons to the turbine blades so that covers or shrouds can be secured to the turbine blades by means of the tenons; and, in particular, the present invention relates to methods for the restoration, repair or replacement of the tenons at the turbine blades following damage to the tenons or the partial or complete removal of the tenons from the turbine blades such as for the purpose of removing the covers or shrouds secured to the turbine blades and addressing damage that can have occurred to the turbine blades or other components of the rotor assemblies for example.

The rotating component, or rotor assembly, of a turbine system such as a steam turbine system for example typically includes a central shaft, a disk or wheel secured to the shaft and turbine blades, or turbine buckets as they are often called, particularly with reference to their application to steam turbine systems, attached to the disk. The disk or wheel can be attached to the shaft by being integrally forged with the shaft or shrink fitted and keyed to the shaft for example. The turbine blades or turbine buckets are in turn secured around the circumference of the disk so that the fluid, such as a gas, vapor and/or liquid for example that is directed through the turbine system engages the turbine blades causing the turbine blades and attached disk to rotate thereby rotatably driving the central shaft. The torque produced at the rotating central shaft can be used to drive varieties of equipment such as compressors and electric generators for example. Securing means of various kinds familiar to those skilled in the art can be used to secure the turbine blades to the disk.

The turbine blades extend substantially radially from the turbine shaft and disk, and the ends of the turbine blades that extend radially the furthest distance from the turbine shaft and disk can be provided with tenons that can project outwardly substantially radially from the ends of the turbine blades. The tenons can be machined into the ends of the turbine blades when the turbine blades are manufactured or TIG-welded to the ends of the turbine blades for example. A cover or shroud that can comprise a complete annulus or ring-like structure that encircles the ends of all the turbine blades at which the tenons are located, or can comprise a plurality of segmented arcuate sections that individually encompass less than all the turbine blades but collectively encircle all the turbine blades at their ends, is secured to the ends of the turbine blades by means of the tenons. The cover includes openings the sizes and locations of which correspond with the dimensions and locations of the tenons at the ends of the turbine blades, allowing the tenons to pass through and protrude from the openings when the cover is in place at the ends of the turbine blades. The protruding portions of the tenons are peened or otherwise flattened or upset to secure the cover to the ends of the turbine blades. The cover serves to dampen and stiffen the reaction of the turbine blades to the impinging fluid that is directed through the turbine system and can also provide a circular band at which a seal can be located.

Once the cover is securely in place, access to the turbine blades and tenons, such as may be required to address damage to a turbine blade or tenon or the cover itself, for example, can only be had by removing at least the section of the cover that has been damaged or is located in the vicinity of the damaged blade or tenon. Typically, in that eventuality, the cover is removed by grinding away the portions of the tenons that have been flattened at the cover leaving beneath the cover a remnant of each of the tenons in place at the end of each respective turbine blade. The cover can thereafter be lifted away from the ends of the turbine blades and the necessary restorations, repairs and/or replacements made.

It may be necessary, particularly in the event a tenon has been seriously damaged to remove the remnant of the tenon after the cover has been removed. In any event, according to prior art practices, in connection with the performance of the necessary restorations, repairs and/or replacements, the tenons typically are returned to their original configuration by depositing weld material at the ends of the turbine blades and machining the weld material to a configuration that will allow the tenons to pass through the openings in the cover when the cover is replaced either by reinstalling the original cover or by seating a new cover in place. In those instances in which the tenon remnant has been entirely removed, the weld material is deposited directly onto the end of the turbine blade and in those instances in which a remnant of the tenon remains at the end of the turbine blade, the weld material is deposited on the tenon remnant.

Following the machining of the tenons and the replacement of the cover at the ends of the turbine blades, the portions of the restored tenons that protrude through the openings in the cover are flattened or upset as by peening for example in order to secure the cover to the turbine blades. Typically it will be necessary to subject the tenons to a post-weld heat treatment and because of that necessity, the turbine will have to be taken off-site to a location where heat treating facilities are available in order to completely perform the task of restoring the tenons. An example of a procedure as has been described is disclosed in U.S. Pat. No. 7,034,262 entitled "Apparatus and Methods for Repairing Tenons on Buckets" which is incorporated herein by reference

BRIEF DESCRIPTION OF THE INVENTION

The following sets forth a simplified summary of examples of the present invention for the purpose of providing a basic understanding of selected aspects of the invention. The summary does not constitute an extensive overview of all the aspects or embodiments of the invention. Neither is the summary intended to identify critical aspects or delineate the scope of the invention. The sole purpose of the summary is to present selected aspects of the invention in a simplified form as an introduction to the more detailed description of the embodiments of the invention that follows the summary.

According to one aspect of the invention, tenons are installed at the ends of turbine blades by applying a solid state bonding procedure to join the tenons to the ends of the turbine blades. An example of solid state bonding procedure that can be employed is a friction welding technique According to another aspect of the invention, tenons installed at the ends of turbine blades by applying a solid state bonding procedure can be employed to assemble the turbine blades to one or more covers for the turbine blades. The one or more covers are provided with openings of a size and location to allow the tenons present at the ends of the turbine blades to pass through and protrude from the openings when the one or more covers are placed at the ends of the turbine blades. The portions of the tenons protruding through the openings in the one or more covers can be deformed so as to expand the perimeters of the tenons beyond the margins of the openings, thereby securing the one or more covers to the turbine blades.

As an alternative to this aspect of the invention, the one or more covers can be placed at the ends of the turbine blades prior to the tenons being installed and the tenons can be installed through the openings present in the one or more covers.

According to a further aspect of the invention a rotor assembly that includes turbine blades secured to a common disk, tenons located at one end of the turbine blades and one or more covers secured to the turbine blades by means of the tenons can be restored, repaired and/or replaced. The restorations, repairs and/or replacements are accomplished by freeing the one or more covers from the tenons, removing the one or more covers, restoring, repairing and/or replacing at least a component of the rotor assembly to which access has been provided by the removal of the one or more covers, installing tenons at the ends of the turbine blades from which the covers have been removed by applying a solid state bonding procedure to join the tenons to the ends of the turbine blades, replacing the one or more covers that have been removed either by reinstalling the original one or more covers or putting one or more new covers in place so that portions of the tenons located at the ends of the turbine blades pass through the openings in the one or more replaced covers and deforming those portions of the tenons so as to secure the one or more replaced covers to the ends of the turbine blades.

According to yet another aspect of the invention, in instances in which tenon remnants are present at the ends of the turbine blades as a result of freeing the one or more covers from the tenons for example, tenon enlargement elements can be joined to the tenon remnants by the solid state bonding procedure and the tenons installed in that manner.

Particular embodiments of the foregoing aspects of the invention can include performing the tenon installations at the turbine blades, assembling the turbine blades to the covers and the restoring, repairing and/or replacing the rotor assembly components in situ rather than off-site.

BRIEF DESCRIPTION OF THE DRAWINGS

The foregoing and other aspects of the present invention will be apparent to those skilled in the art to which the present invention relates from the detailed descriptions of examples of aspects and embodiments of the invention that follow with reference to the accompanying drawings, wherein the same reference numerals are used in the several figures to refer to the same parts or elements and in which:

FIG. 5 is a perspective view of an example of a tenon installed at a turbine blade prior to the tenon being machined to a desired configuration;

FIG. 6 is a perspective view of an example of a tenon installed at a turbine blade undergoing machining to a desired configuration;

FIG. 7 is a schematic perspective view that illustrates a third example of a method of installing a tenon at a turbine blade by the application of a solid bonding procedure; and FIG. 8 is a schematic perspective view that illustrates a fourth example of a method of installing a tenon at a turbine blade by the application of a solid bonding procedure.

DETAILED DESCRIPTION

Examples of embodiments that incorporate one or more aspects of the present invention are described below with references, in certain respects, to the accompanying drawings. These examples are not intended to be limitations on the present invention. Thus, for example, in some instances, one or more examples of the present invention described with reference to one aspect or embodiment can be utilized in other aspects and embodiments. In addition, certain terminology is used herein for convenience only and is not to be taken as limiting the present invention.

Figure 1:
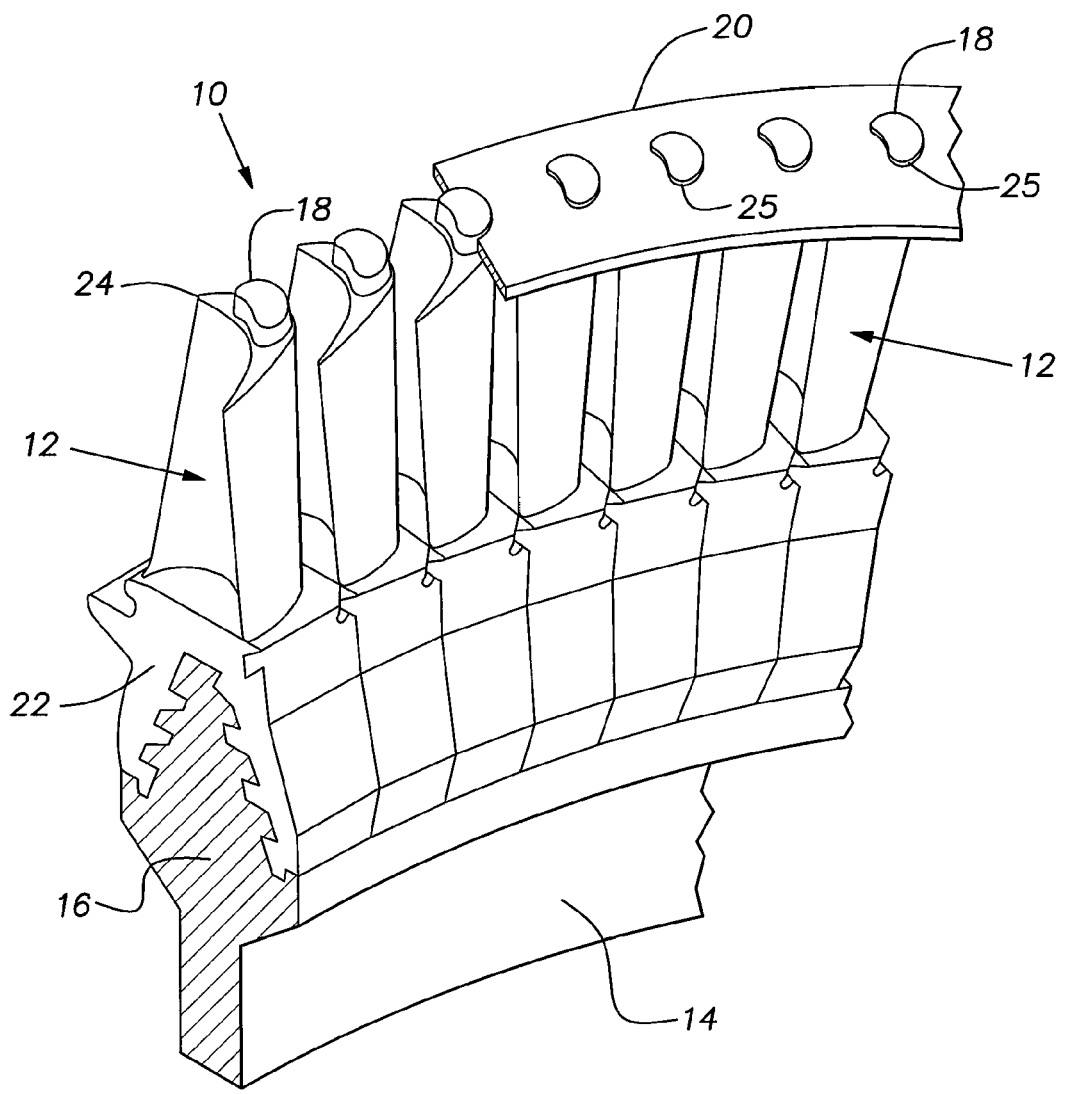
FIG. 1 is a perspective view of an example of a section of a rotor assembly of a turbine system.

FIG. 1 illustrates somewhat schematically and in perspective a section or portion of a rotor assembly of a turbine system, such as steam turbine system for example. The section of the rotor assembly shown in FIG. 1, and indicated generally at 10, is illustrative of the structure of the entire rotor assembly for the turbine system. The rotor assembly 10 includes: a plurality of turbine blades 12, also referred to in the art as turbine buckets; a turbine disk 14 or wheel to which the turbine blades 12 are secured in common by means of a dovetail connection 16; a tenon 18 located at one end of each of the turbine blades 12; and one or more covers 20 secured to the plurality of turbine blades 12 by means of the tenons 18. A shaft, not shown, is secured to the turbine disk 14 at the center of the disk by forging for example and the rotation of the turbine blades 12 and the turbine disk 14 imparts rotational motion to the shaft for the purpose of driving equipment such as an electrical generator or compressor for example to which the shaft is coupled. In a turbine system such as a steam turbine system for example, more than one rotor assembly secured to the shaft can be provided.

Each turbine blade 12 includes a first end 22 that is secured to the turbine disk 14 and a second end 24 that is located substantially opposite the first end 22 of the turbine blade. In FIG. 1, only one tenon 18 is shown to be located at the second end 24 of each turbine blade 12, although more than one tenon can be present. Also in FIG. 1, only a single cover 20 is shown as being located at the second ends 24 of the plurality of turbine blades 12 and as being secured to the second ends 24 of the plurality of turbine blades 12 by means of a respective one or more tenons 18 located at the second end 24 of each turbine blade 12. While it is possible to have a single unitary cover in the form of an annulus or ring encircling the entire circumference of the second ends 24 of the turbine blades 12, an alternative is to provide more than one cover in the form of arcuate units that individually cover fewer than all the turbine blades 12 but collectively encircle the entire complement of the turbine blades 12.

Figure 2:
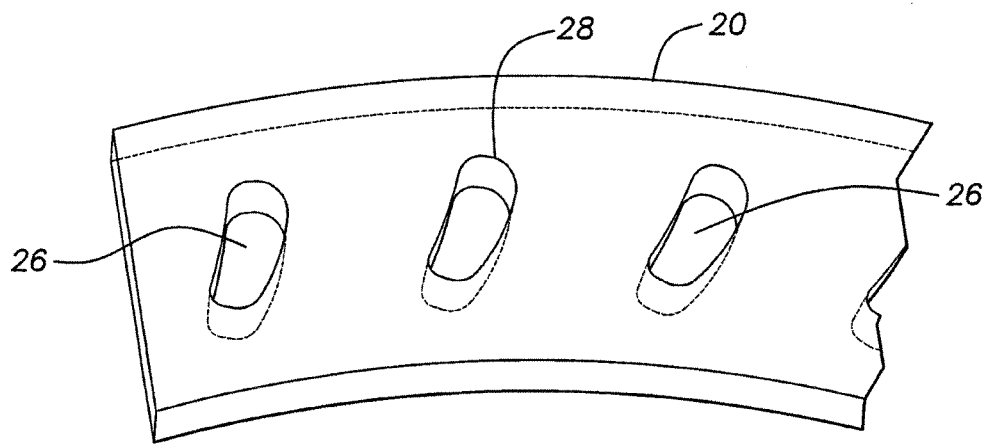
FIG. 2 is front elevational view of an example of a section of a cover that can be attached to turbine blades by means of one or more tenons installed at the turbine blades.

The tenons 18 of FIG. 1 are shown as having a generally kidney-shaped configuration. However, the tenons can have other shapes. For example, the tenons can be cylindrical in shape with a circular cross-section or possess a generally rectangular or square cross-section. In any event, as can be seen in FIG. 2, wherein a section of a cover 20 is shown, the cover includes openings 26 of a size and located to allow the tenons 18 present at the second ends 24 of the turbine blades 12 to pass through when the one or more covers 20 are placed at the second ends 24 of the turbine blades 12. The tenons 18 are of a length sufficient that a portion 25 of each of the tenons protrudes through the openings 26 in the one or more covers 20. The one or more covers 20 are secured to the turbine blades 12 by deforming the portions 25 of the tenons 18 that protrude through the openings 26 in the one or more covers 20 so as to expand the perimeters of the tenons 18 beyond the margins 28 of the openings 26 in the one or more covers 20. The deformation of the portions 25 of the tenons can be accomplished, for example, by peening or upsetting the portions 25.

Figure 3:
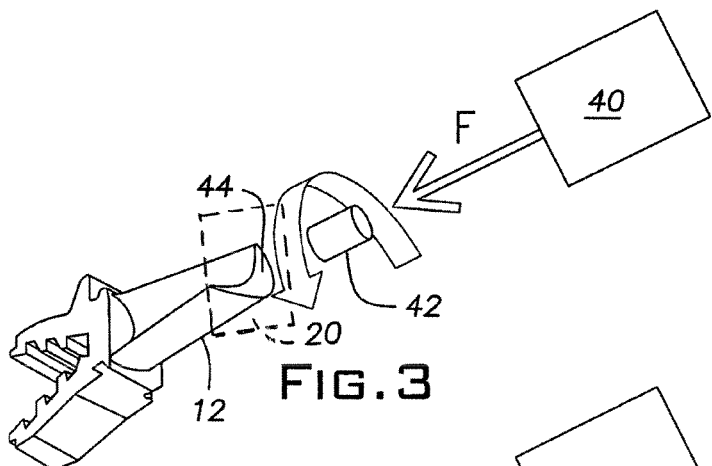
FIG. 3 is a schematic perspective view that illustrates a first example of a method of installing a tenon at a turbine blade by the application of a solid bonding procedure.
Figure 4:
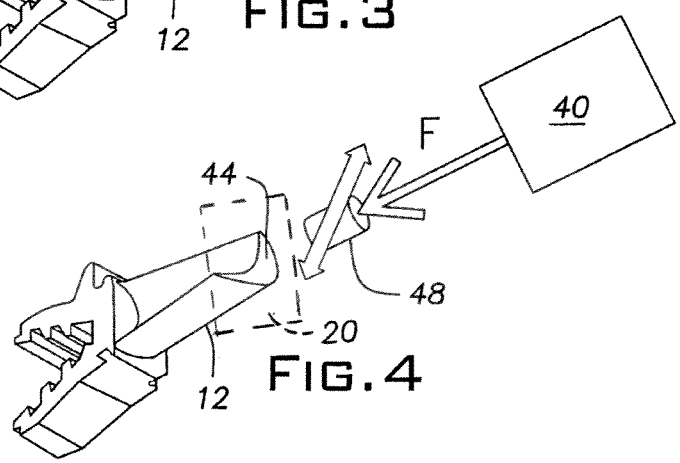
FIG. 4 is a schematic perspective view that illustrates a second example of a method of installing a tenon at a turbine blade by the application of a solid bonding procedure.

One aspect of the present invention concerns a method of installing at least one respective tenon at each of one or more turbine blades and can be described with reference to FIGS. 3 and 4. As shown in FIGS. 3 and 4, the turbine blade 12 which is representative of one or more turbine blades at which at least one respective tenon 18 is to be installed is provided. As described above, the turbine blade 12 includes a first end 22 that is configured to be secured to a turbine disk such as turbine disk 14 for example and a second end 24 that is located substantially opposite the first end 22 of the turbine blade 12. Also as illustrated in FIGS. 3 and 4, the second end 24 of each turbine blade 12 provided is oriented in an attitude that is accommodative to the installation of at least one respective tenon 18 at the second end 24 of each turbine blade 12 provided. Once the second end 24 of the turbine blade 12 is appropriately oriented, at least one respective tenon 18 is installed at the second end 24 of each turbine blade 12 provided by applying a solid state bonding procedure to join the at least one respective tenon 18 to the second end 24 of each turbine blade 12 provided. Because the solid state bonding procedure, and particularly the friction welding technique, can be such that the installed tenons do not have to be heat treated following their installation, the turbine blades do not have to be taken to an off-site facility for heat treatment. Thus, the method of the invention can be performed in situ.

Solid state bonding procedures involve processes, for example, in which two workpieces are joined under pressure providing an intimate contact between the workpieces and at a suitable temperature resulting in the diffusion of the interface atoms of the two workpieces and the joining of the workpieces. Examples of solid state bonding procedures include: ultrasonic bonding or welding in which two workpieces are bonded as a result of opposing forces being exerted at the workpieces along with the application of high frequency acoustic vibration; and cold bonding or welding in which two workpieces are joined together at room temperature and under opposed forces providing an intimate contact between the surfaces of the workpieces and causing a substantial deformation of the workpieces.

In the example of the aspect of the invention illustrated in FIGS. 3 and 4, the solid bonding procedure employed includes a friction bonding or friction welding procedure. In a friction welding procedure, two workpieces are brought in contact by friction pressure typically when one of the workpieces is set in rapid motion, usually linearly or rotationally, against the other workpiece and pressure applied to the moving workpiece against the resistance of the other workpiece. The rapid movement between the workpieces results in the heating of the workpieces where they are in contact with one another and the pressure applied to the moving workpiece against the resistance of the other workpiece results in the joining of the workpieces.

Friction welding equipment is familiar to those skilled in the art and an example of such friction welding equipment is schematically illustrated at 40 in FIGS. 3 and 4. As indicated in FIG. 3, the friction welding equipment 40 sets in rapid rotational motion a first workpiece 42 against the surface 44 of the second end 24 of the turbine blade 12. At the same time, the friction welding equipment applies a force F to the first workpiece 42 against the resistance of the turbine blade 12 which can be held in place by suitable restraining means. The rapid rotational motion of the first workpiece 42 against the surface 44 of the turbine blade 12 and the pressure applied to the first workpiece 42 against the resistance of the turbine blade 12 results in the first workpiece 42 becoming bonded to the surface 44 of the turbine blade 12 as indicated in FIG. 5.

The first workpiece 42 installed at the turbine blade 12, thus, can constitute a tenon for the turbine blade 12. However, because the shape of the first workpiece 42 after it is bonded to the surface 44 of the turbine blade 12 may not possess a desired configuration, the first workpiece 42 can be machined into the desired configuration as shown in FIG. 6 wherein the first workpiece 42 is shown as being milled by the milling machine 46 so as to provide a tenon having a kidney-shaped configuration that corresponds to the openings 26 in the one or more covers 20.

FIG. 4 illustrates an alternate friction welding procedure for installing tenons to the second ends of the turbine blades. In the procedure of FIG. 4, a second workpiece 48 is set in rapid transverse motion back and forth across the surface 44 of the second end 24 of the turbine blade 12. At the same time, a force F is applied to the second workpiece 48 against the resistance of the turbine blade 12. The rapid transverse movement of the second workpiece 48 against the surface 44 of the turbine blade 12 and the pressure applied to the second workpiece 48 against the resistance of the turbine blade 12 results in the second workpiece 48 becoming bonded to the surface 44 of the turbine blade 12. Again, the second workpiece 48 as joined to the turbine blade 12 can constitute the final configuration of the tenon; however, the second workpiece 48 as installed at the turbine blade 12 can be milled or otherwise shaped into a tenon having a configuration that best corresponds to the openings in the cover that is subsequently attached to the tenon.

The example of the method of the invention described above with reference to FIGS. 3 and 4 can be applied to a method of assembling a plurality of the turbine blades 12 and one or more covers 20 for the turbine blades by means of the tenons installed at the turbine blades. In an example of the assembling method, a plurality of the turbine blades 12 at each of which at least one respective tenon has been installed by a solid bonding procedure, such as a friction welding technique for example, is provided. One or more covers, such as the covers illustrated in FIG. 2, also are provided for installation at the second ends 24 of the plurality of turbine blades 12. The one or more covers including openings, such as openings 26, of a size and located to allow the tenons, such as tenons 18, present at the second ends 24 of the plurality of turbine blades 12 to pass through the openings when the one or more covers are placed at the second ends of the plurality of turbine blades. The one or more covers are placed at the second ends of the plurality of turbine blades so that a portion of the tenons, such as portions 25, present at the second ends of the plurality of turbine blades protrude through respective openings in the one or more covers. Thereafter, the portions 25 of the tenons 18 protruding through the openings in the one or more covers are deformed so as to expand the perimeters of the tenons beyond the margins 28 of the openings 26, thereby securing the one or more covers 20 to the plurality of turbine blades 12. As with the example of the method of the invention described above with reference to FIGS. 3 and 4, the method of assembling the turbine blades and the covers can be performed in situ.

In a further aspect of the invention, the assembling of a plurality of the turbine blades and one or more covers by means of tenons installed at the turbine blades can be carried out by installing the tenons through openings in the one or more covers. In an example of this aspect of the invention, a plurality of turbine blades, such as the turbine blades 12, at which at least one respective tenon, such as the tenon 18, is to be installed are provided. As previously described, each turbine blade would include a first end 22 that is configured to be secured to a common turbine disk such as turbine disk 14 and a second end 24 that is located substantially opposite the first end 22 of the turbine blade 12. The plurality of turbine blades 12 at which at least one respective tenon 18 is to be installed are oriented in an attitude that is accommodative to the installation of at least one respective tenon 18 at the second end 24 of each of the plurality of turbine blades 12. One or more covers such as the cover 20 are provided for installation at the second ends 24 of the plurality of turbine blades 12 at which at least one respective tenon 18 is to be installed. The one or more covers 20 including openings such as openings 26 of a size and located to allow respective tenons 18 to be installed through the openings and bonded to respective second ends 24 of the plurality of turbine blades 12 when the one or more covers 20 are placed at the second ends 24 of the plurality of turbine blades 12. The one or more covers 20 are placed at the second ends 24 of the plurality of turbine blades 12 at which at least one respective tenon 18 is to be installed so that the openings 26 in the one or more covers 20 are positioned at each of the respective second ends 24 of the plurality of turbine blades 12. At least one respective tenon 18 is installed at the second end 24 of each of the plurality of turbine blades 12 at which at least one respective tenon 18 is to be installed through a respective opening 26 in the one or more covers 20 by applying a solid state bonding procedure such as a friction welding technique to join each respective tenon 18 to the second end 24 of a respective one of the plurality of turbine blades 12. The solid state bonding procedure can be managed so as to cause the free ends of the tenons 18 to be enlarged as the opposite ends of the tenons are joined to the turbine blades 12, and, as a result, the one or more covers 20 will be secured to the tenons 18. Alternately, the tenons 18 can be of a size such that a portion, such as portion 25, of each tenon 18 installed protrudes through a respective opening 26 in the one or more covers 20. In that case, the portions 25 of the tenons 18 protruding through the openings 26 in the one or more covers 20 can be deformed so as to expand the perimeters of the tenons 18 beyond the margins 28 of the openings 26, thereby securing the one or more covers 20 to the plurality of turbine blades 12. This aspect of the invention can be performed in situ because there is no need to take the turbine blades 12 off site in order to heat treat the tenons 18 that have been installed.

Another aspect of the invention concerns a method of restoring a rotor assembly of a turbine system. The rotor assembly can be of the type illustrated in FIG. 1 and, as described above, include: a plurality of turbine blades such as turbine blades 12 wherein each turbine blade includes a first end 22 that is secured to a turbine disk 14 and a second end 24 that is located substantially opposite the first end of the turbine blade; one or more tenons such as tenons 18 located at the second end of each turbine blade; and one or more covers such as cover 20 located at the second ends of the plurality of turbine blades, the one or more covers being secured to the second ends of the plurality of turbine blades by means of a respective one or more tenons located at the second end of each turbine blade. In this aspect of the invention, the method includes freeing one or more of the covers 20 from the tenons 18 that secure the one or more covers to the second ends 24 of the plurality of turbine blades 12 and removing from the second ends 24 of the plurality of turbine blades 12 the one or more covers 20 freed from the tenons 18. The method also includes restoring at least a portion of the rotor assembly from which the one or more covers 20 have been removed. The plurality of turbine blades 12 at which at least one respective tenon 18 is to be installed and from which the one or more covers 20 has been removed is oriented in an attitude that is accommodative to the installation of at least one respective tenon 18 at the second end 24 of each of those of the plurality of turbine blades 12 at which at least one respective tenon 18 is to be installed and from which the one or more covers 20 has been removed. At least one respective tenon 18 at the second end 24 of each of the plurality of turbine blades 12 at which at least one respective tenon 18 is to be installed and from which the one or more covers 20 has been removed is installed by applying a solid state bonding procedure such as a friction welding technique to join the respective tenon 18 to the second end 24 of each of the plurality of turbine blades 12 at which at least one respective tenon 18 is to be installed and from which the one or more covers 20 has been removed. One or more covers 20 for installation at the second ends 24 of the plurality of turbine blades 12 are provided and the one or more covers 20 include the openings 26 which are of a size and located to allow the tenons 18 present at the second ends 24 of the plurality of turbine blades 12 to pass through the openings 26 when the one or more covers 20 is placed at the second ends 24 of the plurality of turbine blades 12. The one or more covers 20 at the second ends 24 of the plurality of turbine blades 12 are placed so that a portion 25 of the tenons 18 at the second ends 24 of the plurality of turbine blades 12 protrude through respective openings 26 in the one or more covers 20. Thereafter the portions 25 of the tenons 18 protruding through the openings 26 in the one or more covers 20 are deformed so as to expand the perimeters of the tenons 18 beyond the margins 28 of the openings 26, thereby securing the one or more covers 20 to the plurality of turbine blades 12. Again, because the installed tenons do not have to be taken off site for heat-treating purposes, the method can be performed in situ.

In the examples illustrated in FIGS. 3 and 4, the first workpiece 42 and the second workpiece 48 are shown as being installed directly to the surfaces 44 of the second ends 24 of respective turbine blades 12 as might be the case, for example, when the tenons are initially installed at the turbine blades. In instances, however, in which the turbine blades have been in operation at a rotor assembly and it becomes necessary, for example, to repair a component of the rotor assembly to which access can be had only by removing one or more of the covers 20, the one or more covers will have to be freed from the tenons 18 securing the one or more covers to the turbine blades 12. A typical way of freeing the covers 20 is to grind away the portions 25 of the tenons 18 that secure the one or more covers to the turbine blades 12. In doing so, a tenon remnant such as a first tenon remnant 50 shown at the surface 44 of the turbine blade 12 in FIG. 7 or a second tenon remnant 52 shown at the surface 44 of the turbine blade 12 in FIG. 8 will remain. In those cases, the tenon remnant can be identified for restoration and a replacement tenon can be installed at the turbine blade 12 by applying a solid bonding procedure such as a friction welding technique at the tenon remnant in a manner similar to that applied directly to the surface 44 of the turbine blade 12 as shown in and discussed above with reference to FIGS. 3 and 4. More specifically, either a third workpiece 54 is set in motion by the friction welding equipment 40 rotationally with respect to the first tenon remnant 50 identified for restoration as shown in FIG. 7 or a fourth workpiece 56 is set in motion by the friction welding equipment 40 transversely with respect to the second tenon remnant 52 identified for restoration as shown in FIG. 8. A force is applied by the friction welding equipment 40 to the third workpiece 54 and the fourth workpiece 56 in respective instances driving the workpieces against the first tenon remnant 50 and second tenon remnant 52 and bonding the third workpiece 54 and the fourth workpiece 56 to the first tenon remnant 50 and the second tenon remnant 52, respectively. If necessary, the third workpiece 54 and the fourth workpiece 56, which serve as tenon enlargement elements, after being joined to the respective tenon remnants can be machined, such as by milling for example, to provide a tenon having a desired configuration.

While the present invention has been described above and illustrated with reference to certain embodiments thereof, it is to be understood that the invention is not so limited. Modifications and alterations of the aspects of the invention described herein will occur to those skilled in the art upon reading and understanding the specification, including the drawings. The present invention is intended to cover and include any and all such modifications and variations to the described embodiments that are encompassed by the following claims.

What is claimed is:

1. A method of installing at least one respective tenon at each of one or more turbine blades including:
providing one or more turbine blades at which at least one respective tenon is to be installed, each turbine blade including a first end that is configured to be secured to a turbine disk and a second end that is located substantially opposite the first end of the turbine blade;
orienting the second end of each turbine blade at which at least one respective tenon is to be installed in an attitude that is accommodative to the installation of the at least one respective tenon at the second end of each turbine blade; and
installing the at least one respective tenon at the second end of each turbine blade at which the at least one respective tenon is to be installed by applying a solid state bonding procedure to join the at least one respective tenon to the second end of each turbine blade;
wherein the second end of each turbine blade at which the at least one respective tenon is to be installed includes at least one tenon remnant identified for restoration and the step of installing the at least one respective tenon at the second end of each turbine blade at which the at least one respective tenon is to be installed by applying a solid state bonding procedure to join the at least one respective tenon to the second end of the turbine blade includes bonding a respective tenon enlargement element to each of the at least one tenon remnants identified for restoration.

2. The method of claim 1 wherein the solid state bonding procedure includes a friction welding technique.

3. The method of claim 1 wherein the solid state bonding procedure includes a friction welding technique.

4. The method of claim 1 wherein the method is performed in situ.

5. A method of assembling a plurality of turbine blades and one or more covers for the turbine blades by means of tenons installed at the turbine blades through openings in the one or more covers including:
providing a plurality of turbine blades at which at least one respective tenon is to be installed, each turbine blade including a first end that is configured to be secured to a common turbine disk and a second end that is located substantially opposite the first end of the turbine blade;
orienting the plurality of turbine blades at which at least one respective tenon is to be installed in an attitude that is accommodative to the installation of at least one respective tenon at the second end of each of the plurality of turbine blades;
providing one or more covers for installation at the second ends of the plurality of turbine blades at which at least one respective tenon is to be installed, the one or more covers including openings of a size and located to allow respective tenons to be installed through the openings and bonded to respective second ends of the plurality of turbine blades when the one or more covers are placed at the second ends of the plurality of turbine blades;
placing the one or more covers at the second ends of the plurality of turbine blades at which at least one respective tenon is to be installed so that the openings in the one or more covers are positioned at each of the respective second ends of the plurality of turbine blades; and
installing at least one respective tenon at the second end of each of the plurality of turbine blades at which at least one respective tenon is to be installed through a respective opening in the one or more covers by applying a solid state bonding procedure to join each respective tenon to the second end of a respective one of the plurality of turbine blades.

6. The method of claim 5 wherein the solid state joining procedure includes a friction welding technique.

7. The method of claim 5 wherein at least one of the plurality of turbine blades at which at least one respective tenon is to be installed includes at the second end thereof at least one tenon remnant identified for restoration, and the step of installing at least one respective tenon at the second end of each of the plurality of turbine blades at which at least one respective tenon is to be installed through a respective opening in the one or more covers by applying a solid state bonding procedure to join each tenon to the second end of a respective one of the plurality of turbine blades includes bonding a respective tenon enlargement element to each of the at least one tenon remnant identified for restoration.

8. The method of claim 7 wherein the solid state bonding procedure includes a friction welding technique.

9. The method of claim 5 wherein the method is performed in situ.

* * * * *